US012663568B2

(12) United States Patent
Ishimaru et al.

(10) Patent No.: US 12,663,568 B2
(45) Date of Patent: Jun. 23, 2026

(54) OPTICAL FILM, DISPLAY DEVICE USING THE SAME, COMPOSITION FOR FORMING COLORED LAYER USED FOR PRODUCING OPTICAL FILM

(71) Applicants: TOPPAN INC., Tokyo (JP); TOPPAN TOMOEGAWA OPTICAL FILMS CO., LTD., Tokyo (JP)

(72) Inventors: Yoshiko Ishimaru, Tokyo (JP); Sohei Kadota, Tokyo (JP); Koichi Minato, Tokyo (JP); Ryota Ozaki, Tokyo (JP); Rui Inoue, Tokyo (JP)

(73) Assignees: TOPPAN INC., Tokyo (JP); TOPPAN TOMOEGAWA OPTICAL FILMS CO., LTD., Tokyo (JP)

( * ) Notice: Subject to any disclaimer, the term of this patent is extended or adjusted under 35 U.S.C. 154(b) by 249 days.

(21) Appl. No.: 18/222,303

(22) Filed: Jul. 14, 2023

(65) Prior Publication Data

US 2023/0375762 A1 Nov. 23, 2023

Related U.S. Application Data

(63) Continuation of application No. PCT/JP2021/034759, filed on Sep. 22, 2021.

(30) Foreign Application Priority Data

Jan. 19, 2021 (JP) ................................ 2021-006475

(51) Int. Cl.
*G02B 5/22* (2006.01)

(52) U.S. Cl.
CPC ..................................... *G02B 5/22* (2013.01)

(58) Field of Classification Search
CPC . G02B 5/22; G02B 5/223; G02B 1/11; G02B 1/12; G02B 1/14; G02B 1/16;
(Continued)

(56) References Cited

U.S. PATENT DOCUMENTS 6,307,671 B1 10/2001 Yabuki
12,085,742 B2 * 9/2024 Katou ................. G02B 5/3016
(Continued)

FOREIGN PATENT DOCUMENTS

JP 2001-147319 A 5/2001
JP 2002-055225 A 2/2002
(Continued)

OTHER PUBLICATIONS

Examiner provided machine translation of Yoshihiro et al., JP 2019056865 A (Year: 2019).*
(Continued)

*Primary Examiner* — Balram T Parbadia
(74) *Attorney, Agent, or Firm* — Squire Patton Boggs (US) LLP

(57) ABSTRACT

Provided are an optical film that can reduce reflectance, increase luminance, reduce thickness, and improve color reproducibility a display device, and a display device using the same. An optical film characterized by comprising a transparent substrate, a colored layer laminated on one surface side of the transparent substrate and containing a dye, and a functional layer laminated on the other surface side of the transparent substrate, wherein the dye contains a first coloring material having a maximum absorption wavelength of 470 to 530 nm and a half width of the absorption spectrum of 15 to 45 nm, and a second coloring material having a maximum absorption wavelength of 560 to 620 nm and a half width of the absorption spectrum of 15 to 55 nm, and the transparent substrate has an ultraviolet shielding rate of 85% or more according to JIS L 1925.

11 Claims, 3 Drawing Sheets

(58) Field of Classification Search

CPC .......................... C08J 2301/12; C08J 2333/12; C08J 2367/02; C08J 2429/04; C08J 2433/06; C08J 7/042; C08J 7/046; C08J 7/048; C08J 7/16; C08J 7/044; C08K 5/375; C08K 5/39; C08K 5/521; C08K 5/3435; C08K 5/0041; C08K 5/005; C08K 5/17; C09D 7/41; C09D 7/61; C09D 7/63; G09F 9/30

See application file for complete search history.

(56) References Cited

U.S. PATENT DOCUMENTS

| | | | | |
|---|---|---|---|---|
| 2004/0204555 | A1* | 10/2004 | Noda | G02B 5/208 359/359 |
| 2005/0277729 | A1* | 12/2005 | Tsunemine | C09J 7/22 428/323 |
| 2007/0275184 | A1* | 11/2007 | Lee | C09B 1/201 428/1.3 |
| 2013/0085215 | A1 | 4/2013 | Shitara et al. | |
| 2015/0197670 | A1 | 7/2015 | Shitara et al. | |
| 2018/0113350 | A1* | 4/2018 | Jee | C08J 7/046 |
| 2018/0134953 | A1* | 5/2018 | Shin | G02B 6/00 |
| 2020/0004051 | A1* | 1/2020 | Wada | G02C 7/10 |
| 2020/0392344 | A1 | 12/2020 | Nara et al. | |

FOREIGN PATENT DOCUMENTS

| | | | |
|---|---|---|---|
| JP | 2002-071940 | A | 3/2002 |
| JP | 2003-036033 | A | 2/2003 |
| JP | 2008-203436 | A | 9/2008 |
| JP | 2011-141356 | A | 7/2011 |
| JP | 2013-075978 | A | 4/2013 |
| JP | 2013-251376 | A | 12/2013 |
| JP | 2017-138534 | A | 8/2017 |
| JP | 2018-136361 | A | 8/2018 |
| JP | 2019-008294 | A | 1/2019 |
| JP | 2019-056865 | A | 4/2019 |
| JP | 2019-061241 | A | 4/2019 |
| JP | 2019-191507 | A | 10/2019 |
| KR | 2015-0039300 | A | 4/2015 |
| WO | WO 2017/099016 | A1 | 6/2017 |
| WO | WO 2018/164052 | A1 | 9/2018 |
| WO | WO 2019/004044 | A1 | 1/2019 |

OTHER PUBLICATIONS

Examiner provided machine translation of Cho et al., KR 20150039300 A (Year: 2015).*

International Search Report mailed Nov. 9, 2021 for International Application No. PCT/JP2021/034759, with English translation, 7 pages.

ADEKA Corporation, Polymer Additives, ADK STAB, Catalog, with partial English translation, 3 pages.

BASF Schweiz AG, Technical Information, Plastic Additives, Chimassorb 944, Oligomeric hindered amine light stabilizer (HALS), Aug. 2019, DataSheet, Second Edition, pp. 1-3, 3 pages.

BASF Schweiz AG, Technical Information, Plastic Additives, Tinuvin 622, Oligomeric hindered amine light stabilizer (HALS), Mar. 2011, pp. 1-2, 2 pages.

Tinuvin944, URL:https://www.chembk.com/en/chem/Tinuvin%20944, 6 pages.

Yamashita, "Light Stabilizers, Approach for Prevention of Polymer Degradation", Journal of the Society of Rubber Science and Technology, Japan, vol. 91(12), 2018, with partial English translation, 7 pages.

* cited by examiner

OPTICAL FILM, DISPLAY DEVICE USING THE SAME, COMPOSITION FOR FORMING COLORED LAYER USED FOR PRODUCING OPTICAL FILM

CROSS REFERENCE TO RELATED APPLICATION

This application is a bypass continuation application of International Application No. PCT/JP2021/034759 filed on Sep. 22, 2021, claiming the priority based on Japanese Patent Application No. 2021-006475 filed on Jan. 19, 2021. The disclosures in these applications are incorporated in the present specification by reference.

BACKGROUND

Field

The present invention relates to an optical film, a display device using the same, and a composition for forming colored layer used for producing the optical film.

Description of the Related Art

A display device is often used in an environment where external light is incident regardless of whether it is indoors or outdoors. External light incident on the display device is reflected on the surface of the display device, and the reflected image of the external light is mixed with the displayed image, thereby causing deterioration in display quality. Therefore, it is essential to provide the display device with an antireflection function, and in order to improve the display quality, a high performance of the antireflection function is required.

In general, the antireflection function can be imparted by forming a low refractive index layer on the surface of a display device. In addition, in order to increase the performance of the antireflection function, there is also known a method of providing a high refractive index layer or both a medium refractive index layer and a high refractive index layer, and forming a low refractive index layer on the outermost surface.

In addition, there is also a problem that external light incident on a display device is reflected by members inside the display device (e.g., electrodes, phosphors, color filters), and the reflected light is re-emitted from the display surface, resulting in a decrease in display quality. As a solution to this problem, a technique is known in which a circularly polarizing plate is provided on the display surface side to reduce incident light to the inside of the display device and reflected light inside the display device (see, e.g., Japanese Laid-Open Publication No. 2013-251376).

Further, in general, display devices are required to have high color purity. Color purity indicates the range of colors that can be displayed by a display device, and is also called color reproduction range. Therefore, high color purity means a wide color reproduction range and good color reproducibility. For improving the color reproducibility, a method of separating colors using a color filter for a white light source of a display panel or correcting a monochromatic light source with a color filter to narrow the half value is known.

SUMMARY

In a display device using a circularly polarizing plate to provide an antireflection function, the light emitted from the display panel is also absorbed by the circularly polarizing plate. Considering the absorption by a film and the like other than the circularly polarizing plate, the transmittance of the light emitted from the display panel is less than 50%, resulting in a significant decrease in luminance. In order to compensate for the decrease in luminance, it is necessary to increase the emission intensity of the display panel, but this may cause a decrease in the life of the light emitting device. Furthermore, when using a circularly polarizing plate, there is also a problem that thinning is difficult due to the thickness of the circularly polarizing plate itself.

In addition, in order to improve the color reproducibility of the display device, it is necessary to increase the thickness of the color filter and increase the density of the coloring material, which causes problems of lowering of the display quality such as deterioration of the pixel shape and viewing angle characteristics, and the like.

Then, the present invention has an object of providing an optical film that can reduce reflectance, increase luminance, reduce thickness, and improve color reproducibility of a display device, a display device using the same, and a composition for forming colored layer used for producing the optical film.

The optical film according to the present invention is characterized by comprising a transparent substrate, a colored layer laminated on one surface side of the transparent substrate and containing a dye, and a functional layer laminated on the other surface side of the transparent substrate, wherein the dye contains a first coloring material having a maximum absorption wavelength in the range of 470 to 530 nm and a half width of the absorption spectrum of 15 to 45 nm and a second coloring material having a maximum absorption wavelength in the range of 560 to 620 nm and a half width of the absorption spectrum of 15 to 55 nm, and the transparent substrate has an ultraviolet shielding rate of 85% or more according to JIS L 1925.

Moreover, the display device according to the present invention has the optical film described above.

Further, the composition for forming colored layer according to the present invention is characterized by comprising an active energy ray-curable resin, a photopolymerization initiator, a dye, an additive, and a solvent, wherein the dye contains a first coloring material having a maximum absorption wavelength in the range of 470 to 530 nm and a half width of the absorption spectrum of 15 to 45 nm and a second coloring material having a maximum absorption wavelength in the range of 560 to 620 nm and a half width of the absorption spectrum of 15 to 55 nm, and the additive contains at least one of a radical scavenger, a peroxide decomposer and a singlet oxygen quencher.

According to the present invention, it is possible to provide an optical film that can reduce reflectance, increase luminance, reduce thickness, and improve color reproducibility of a display device, a display device using the same, and a composition for forming colored layer used for producing the optical film.

These and other objects, features, aspects, and effects of the present invention will be further clarified from the following detailed description in light of the accompanying drawings.

DETAILED DESCRIPTION

FIGS. 1 to 5 are cross-sectional views showing schematic configurations of display devices according to first to fifth embodiments, respectively. The upper side in FIGS. 1 to 5 corresponds to the observation side when observing the display image of the display device.

Although the details will be described later, the optical films 11 to 15 shown in FIGS. 1 to 5 each include a colored layer 21 containing a dye that absorbs light in a specific wavelength range. The colored layer 21 has a function of reducing the reflected light of the external light by absorbing part of the external light incident on the optical films 11 to 15 and part of the external light reflected by the display panel 10. However, the dye contained in the colored layer 21 has low light resistance, and when it is photo-oxidized by ultraviolet rays contained in external light, the light absorbability decreases. Therefore, in the present invention, by providing an ultraviolet absorbing layer that absorbs ultraviolet rays as the transparent substrate 20 provided closer to the viewing side than the colored layer 21, deterioration (fading) of the colored layer 21 due to incident ultraviolet rays is suppressed.

Figure 1:
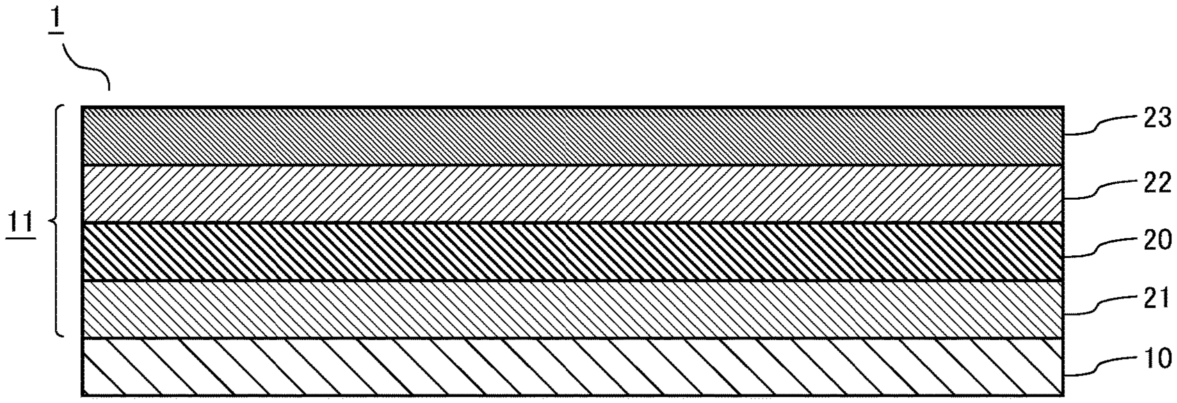
FIG. 1 is a cross-sectional view showing a schematic configuration of the display device according to the first embodiment.

The display device 1 shown in FIG. 1 has a display panel 10 and an optical film 11 provided on the display surface side of the display panel 10. The display panel 10 is a display panel having a light source, and in particular, in the case of a self-luminous display panel such as an organic EL panel, a micro LED panel or the like, metal electrodes or the like and reflective members are provided. The optical film 11 has a transparent substrate 20 having ultraviolet absorbability, a colored layer 21 laminated on one surface side of the transparent substrate 20, a hard coat layer 22 laminated on the other surface side of the transparent substrate 20, and a low refractive index layer 23. The optical film 11 is laminated on the display panel 10 such that the low refractive index layer 23 is the outermost surface on the observation side of the display device 1 and the colored layer 21 faces the display surface side of the display panel 10. The refractive index of the low refractive index layer 23 is lower than that of the hard coat layer 22, and the hard coat layer 22 and the low refractive index layer 23 constitute an antireflection layer. The hard coat layer 22 and the low refractive index layer 23 reduce the reflection of external light by canceling the external light incident on the optical film 11 and the reflected light reflected between the layers in the optical film 11 by interference.

Figure 2:
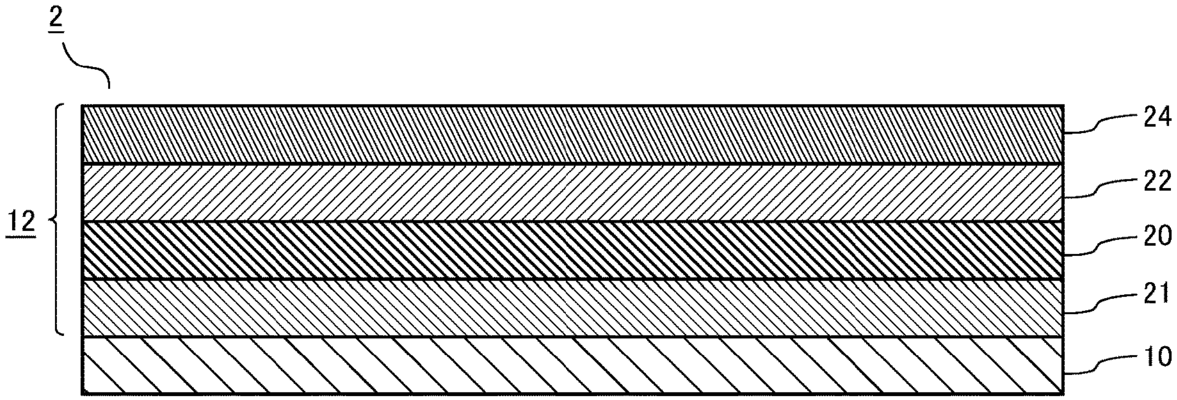
FIG. 2 is a cross-sectional view showing a schematic configuration of the display device according to the second embodiment.

The display device 2 shown in FIG. 2 has a display panel 10 and an optical film 12 provided on the display surface side of the display panel 10. The optical film 12 has a transparent substrate 20 having ultraviolet absorbability, a colored layer 21 laminated on one surface side of the transparent substrate 20, a hard coat layer 22 laminated on the other surface side of the transparent substrate 20, and an antiglare layer 24. The optical film 12 is laminated on the display panel 10 so that the antiglare layer 24 is the outermost surface on the observation side of the display device 2 and the colored layer 21 faces the display surface side of the display panel 10. The antiglare layer 24 is an optical functional layer for controlling reflection of external light, and reduces reflection of external light by scattering the external light with fine unevenness formed on the surface. From the layer structure shown in FIG. 2, the hard coat layer 22 may be omitted and the antiglare layer 24 may be laminated on the transparent substrate 20.

Figure 3:
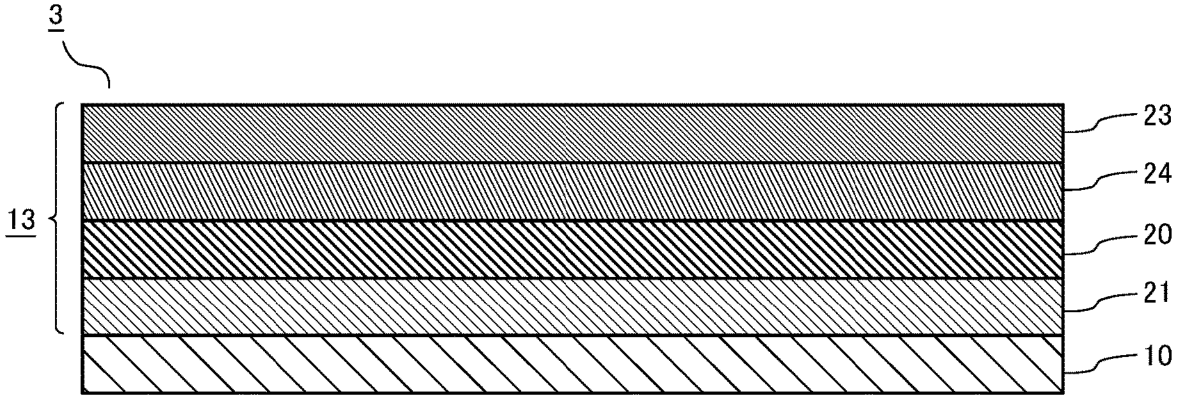
FIG. 3 is a cross-sectional view showing a schematic configuration of the display device according to the third embodiment.

The display device 3 shown in FIG. 3 has a display panel 10 and an optical film 13 provided on the display surface side of the display panel 10. The optical film 13 has a transparent substrate 20 having ultraviolet absorbability, a colored layer 21 laminated on one surface side of the transparent substrate 20, an antiglare layer 24 laminated on the other side of the transparent substrate 20, and a low refractive index layer 23. The optical film 13 is laminated on the display panel 10 so that the low refractive index layer 23 is the outermost surface on the observation side of the display device 1 and the colored layer 21 faces the display surface side of the display panel 10. The antiglare layer 24 is an optical functional layer for controlling reflection of external light, and reduces reflection of external light by scattering the external light with fine unevenness formed on the surface. The refractive index of the low refractive index layer 23 is lower than that of the antiglare layer 24, and the antiglare layer 24 and the low refractive index layer 23 constitute an antireflection layer.

Figure 4:
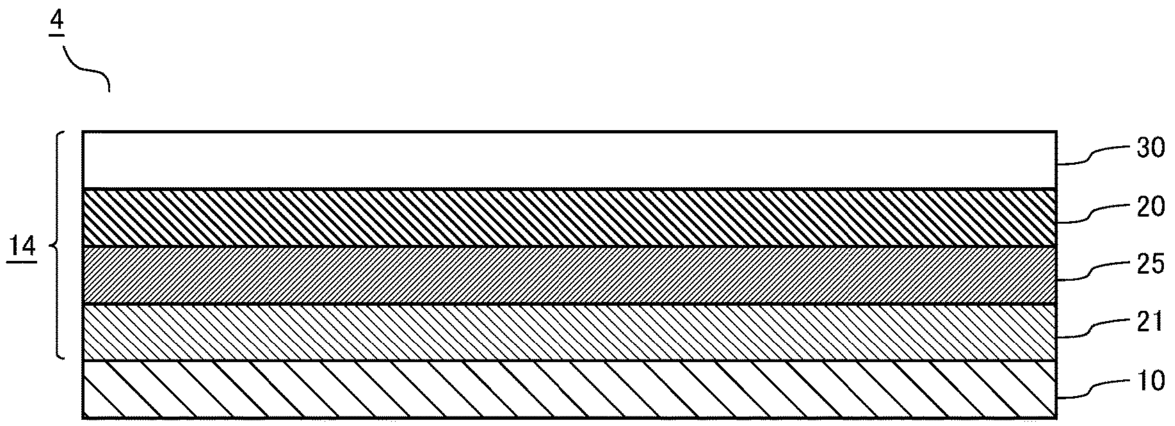
FIG. 4 is a cross-sectional view showing a schematic configuration of the display device according to the fourth embodiment.
Figure 5:
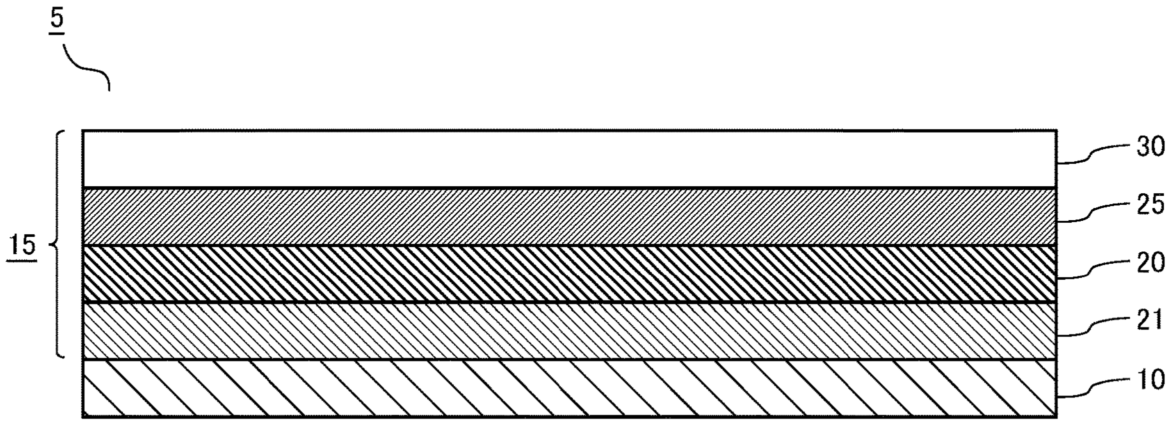
FIG. 5 is a cross-sectional view showing a schematic configuration of the display device according to the fifth embodiment.

The optical film according to the present invention preferably further includes an oxygen barrier layer having an oxygen barrier property on the viewer side of the colored layer 21. FIGS. 4 and 5 show examples of layer structures in which an oxygen barrier layer is further provided.

The display device 4 shown in FIG. 4 has a display panel 10 and an optical film 14 provided on the display surface side of the display panel 10. The optical film 14 has a transparent substrate 20 having ultraviolet absorbability, an oxygen barrier layer 25 and a colored layer 21 laminated on one surface side of the transparent substrate 20, and a functional layer 30 laminated on the other surface side of the transparent substrate 20. The functional layer 30 is a layer provided to impart a function such as a hard coat property or the like to the optical film 14 and to control reflection of incident light, and is, for example, a hard coat layer; an antireflection layer composed of a hard coat layer (high refractive index layer) and a low refractive index layer; an antiglare layer; an antiglare antireflection layer composed of an antiglare layer and a low refractive index layer; or the like. The optical film 14 is laminated on the display panel 10 such that the functional layer 30 is the outermost surface on the viewing side of the display device 4 and the colored layer 21 faces the display surface side of the display panel 10. The oxygen barrier layer 25 is provided between the transparent substrate 20 and the colored layer 21 and closer to the observation side than the colored layer 21, and suppresses deterioration due to oxidation of a dye contained in the colored layer 21 by blocking invasion of oxygen into the colored layer 1. Details of the oxygen barrier layer 25 will be described later.

The display device 5 shown in FIG. 5 has a display panel 10 and an optical film 15 provided on the display surface side of the display panel 10. The optical film 15 includes a transparent substrate 20 having ultraviolet absorbability, a colored layer 21 laminated on one surface side of the transparent substrate 20, an oxygen barrier layer 25 laminated on the other surface side of the transparent substrate 20, and a functional layer 30. The optical film 15 is laminated on the display panel 10 so that the functional layer 30 is the outermost surface on the viewing side of the display device 5 and the colored layer 21 faces the display surface side of the display panel 10. The oxygen barrier layer 25 is provided closer to the viewing side than the transparent substrate 20, and suppresses deterioration due to oxidation of a dye contained in the colored layer 21 by blocking invasion of oxygen into the colored layer 21.

The pencil hardness of the optical films 11 to 15 under a load of 500 g is H or higher. If the pencil hardness is less than H, it is not suitable for use as a reflection control film provided on the surface of a display device.

Note that the optical films 11 to 15 are bonded to the display surface of the display panel 10 via, for example, an adhesive layer (not shown).

<Transparent Substrate>

The transparent substrate 20 is a film that serves as a base for the optical films 11 to 15, and is made of a material that is highly transparent to visible light. As materials for forming the transparent substrate 20, transparent resins such as polyolefins such as polyethylene, polypropylene and the like; polyesters such as polyethylene terephthalate, polybutylene terephthalate, polyethylene naphthalate and the like; polyacrylates such as polymethyl methacrylate and the like; polyamides such as nylon 6, nylon 66 and the like; polyimide, polyarylate, polycarbonate, triacetyl cellulose, polyacrylate, polyvinyl alcohol, polyvinyl chloride, cycloolefin copolymer, norbornene-containing resin, polyethersulfone, polysulfone and the like; and inorganic glass can be used. Among these, a film made of polyethylene terephthalate can be suitably used. Although the thickness of the transparent substrate 20 is not particularly limited, it is preferably 10 to 100 m.

The transparent substrate 20 according to the present embodiment has ultraviolet absorbability and functions as an ultraviolet absorbing layer for protecting the dye contained in the colored layer 21 from ultraviolet rays. Specifically, the ultraviolet shielding rate of the transparent substrate 20 is preferably 85% or more. Here, the ultraviolet shielding rate is a value measured according to JIS L 1925, and calculated by the following formula.

Ultraviolet shielding rate (%)=100−average transmittance of ultraviolet rays with a wavelength of 290 to 400 nm (%)

The ultraviolet absorbability of the transparent substrate 20 can be imparted by, for example, adding an ultraviolet absorber to the resin material for forming the transparent substrate 20. The ultraviolet absorber is not particularly limited, but benzophenone-based, benzotriazole-based, triazine-based, oxalic acid anilide-based, and cyanoacrylate-based compounds can be used.

<Colored Layer>

The colored layer 21 is a layer for reducing light transmitted through the optical films 11 to 15 and reflected light that is reflected and re-emitted by metal electrodes and the like and reflective members present on the surface of the display panel 10, and contains a dye for absorbing visible light. The colored layer 21 according to this embodiment contains a first coloring material and a second coloring material as dyes. The first coloring material has a maximum absorption wavelength in the range of 470 to 530 nm and a half width of the absorption spectrum of 15 to 45 nm, and the second coloring material has a maximum absorption wavelength of 560 to 620 nm and a half width of the absorption spectrum of 15 to 55 nm. By using materials having the above absorption property as the first coloring material and the second coloring material to be contained in the colored layer 21, the visible light in the wavelength range with relatively low emission intensity, among the visible light emitted by the display panel 10, can be absorbed by the colored layer 21.

An optical functional layer such as an antireflection layer or an antiglare layer is provided on the surface side of the optical films 11 to 15 bonded to the display devices 1 to 5, and part of the external light incident on the display devices 1 to 5 is transmitted through the optical functional layer, reaches the display panel 10, and is reflected by metal electrodes and reflective members present on the surface of the display panel 10. Since the light reflected inside the display devices 1 to 5 causes deterioration of the contrast and visibility of the display image of the display panel 10, it has conventionally been planned to use a circularly polarizing plate to reduce the reflected light on the surface of the display panel 10. In the optical films 11 to 15 according to this embodiment, the colored layer 21 containing a dye absorbs part of the incident light transmitted through the optical functional layer instead of reducing the reflected light by the circularly polarizing plate. Part of the remaining incident light not absorbed by the colored layer 21 is reflected by the display panel 10, but the colored layer 21 absorbs part of the reflected light. This greatly reduces the internal reflectance of external light. Since the absorption wavelength ranges of the two dyes contained in the colored layer 21 do not overlap with the maximum wavelength of the light emitted from the display panel 10, a decrease in the intensity of light emitted from the display panel 10 is suppressed.

Although the thickness of the colored layer 21 is not particularly limited, it is preferably 0.5 to 10 μm. If the thickness of the colored layer 21 is less than 0.5 μm, the density of the dye contained in the colored layer 21 may not be sufficient, resulting in insufficient light absorption. When the thickness of the colored layer 21 is less than 0.5 μm, it is not preferable to increase the dye concentration in order to ensure the light absorption, because this causes an abnormality in the appearance. On the other hand, if the thickness of the colored layer 21 exceeds 10 μm, it is disadvantageous in reducing the thickness of the optical films 11 to 15, which is not preferable.

As the dye contained in the colored layer 21, colorants, pigments, nano metals, and the like can be used, and it is preferable to use coloring materials containing one or more compounds selected from the group consisting of compounds having any of a porphyrin structure, a merocyanine structure, a phthalocyanine structure, an azo structure, a cyanine structure, a squarylium structure, a coumarin structure, a polyene structure, a quinone structure, a tetraazaporphyrin structure, a pyrromethene structure and an indigo structure in the molecule, and metal complexes thereof. In particular, it is more preferable to use metal complexes having a porphyrin structure, a pyrromethene structure, or a phthalocyanine structure in the molecule.

Further, the colored layer 21 may further contain a third coloring material having a maximum absorption wavelength within the range of 650 to 800 nm in addition to the above two coloring materials. However, as the third coloring material, a dye whose maximum absorption wavelength is different from the maximum emission wavelength of the display panel 10 is used. By containing the third coloring material in the colored layer 21, reflection of external light can be further reduced.

<Hard Coat Layer>

The hard coat layer 22 is a layer for imparting hardness to the optical films 11 and 12, and can be formed by applying and curing a composition for forming hard coat layer containing at least an active energy ray-curable resin, a photopolymerization initiator, and a solvent. Further, the oxygen barrier property can be improved also by laminating the hard coat layer 22 above the colored layer 21. When the oxygen barrier property is imparted by the hard coat layer 22, deterioration of a dye contained in the colored layer 21 can be suppressed. Although the thickness of the hard coat layer 22 is not particularly limited, it is preferably 2 to 10 μm. If the thickness of the hard coat layer 22 is less than 2 μm, the hardness of the hard coat layer 22 may be insufficient. If the thickness of the hard coat layer 22 exceeds 10 μm, it is disadvantageous in reducing the thickness of the optical films 11 and 12, which is not preferable. However, the coating thickness of the hard coat layer 22 can be appropriately set according to the surface hardness and overall thickness required for the optical film. Further, the hard coat layer 22 may contain metal oxide fine particles for the purpose of adjusting the refractive index and imparting hardness. By blending metal oxide fine particles into the hard coat layer 22 to increase the refractive index, an antireflection layer can be formed together with a low refractive index layer 23 to be described later.

The active energy ray-curable resin is a resin that is polymerized and cured by irradiation with an active energy ray such as an ultraviolet ray, an electron beam or the like, and for example, monofunctional, bifunctional, or tri- or more-functional (meth)acrylate monomers can be used. In this specification, "(meth)acrylate" is a generic term for both acrylate and methacrylate, and "(meth)acryloyl" is a generic term for both acryloyl and methacryloyl.

Examples of monofunctional (meth)acrylate compounds include 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloylmorpholine, N-vinylpyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth) acrylate, 3-methoxybutyl (meth)acrylate, ethyl carbitol (meth)acrylate, phosphoric acid (meth)acrylate, ethylene oxide-modified phosphoric acid (meth)acrylate, phenoxy (meth)acrylate, ethylene oxide-modified phenoxy (meth) acrylate, propylene oxide-modified phenoxy (meth)acrylate, nonylphenol (meth)acrylate, ethylene oxide-modified nonylphenol (meth)acrylate, propylene oxide-modified nonylphenol (meth)acrylate, methoxydiethylene glycol (meth) acrylate, methoxypolyethylene glycol (meth)acrylate, methoxypropylene glycol (meth)acrylate, 2-(meth)acryloyloxyethyl-2-hydroxypropyl phthalate, 2-hydroxy-3-phenoxypropyl (meth)acrylate, 2-(meth)acryloyloxyethyl hydrogen phthalate, 2-(meth acryloyloxy propyl hydrogen phthalate, 2-(meth)acryloyloxypropyl hexahydrohydrogen phthalate, 2-(meth)acryloyloxypropyl tetrahydrohydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate, adamantane derivative mono (meth)acrylates such as adamantyl acrylates having a monovalent mono(meth)acrylate derived from 2-adamantane, or adamantanediol, and the like.

Examples of bifunctional (meth)acrylate compounds include di(meth)acrylates such as ethylene glycol di(meth) acrylate, diethylene glycol di(meth)acrylate, butanediol di(meth)acrylate, hexanediol di(meth)acrylate, nonanediol di(meth)acrylates, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, neopentyl glycol hydroxypivalate di(meth)acrylate, and the like.

Examples of tri- or more-functional (meth)acrylate compounds include tri(meth)acrylates such as trimethylolpropane tri(meth)acrylate, ethoxylated trimethylolpropane tri (meth)acrylate, propoxylated trimethylolpropane tri(meth) acrylate, tris-2-hydroxyethyl isocyanurate tri(meth)acrylate, glycerin tri(meth)acrylate and the like; trifunctional (meth) acrylate compounds such as pentaerythritol tri(meth)acrylate, dipentaerythritol tri(meth)acrylate, ditrimethylolpropane tri(meth)acrylate and the like; tri- or more-polyfunctional (meth)acrylate compounds such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, ditrimethylolpropane hexa(meth)acrylate and the like, and polyfunctional (meth)acrylate compounds in which some of these (meth)acrylates are substituted with alkyl groups or ε-caprolactone.

Further, urethane (meth)acrylates can also be used as the active energy ray-curable resin. Examples of urethane (meth)acrylates include those obtained by reacting a (meth) acrylate monomer having a hydroxyl group with a product obtained by reacting a polyester polyol with an isocyanate monomer or a prepolymer.

Examples of urethane (meth)acrylates include pentaerythritol triacrylate hexamethylene diisocyanate urethane prepolymer, dipentaerythritol pentaacrylate hexamethylene diisocyanate urethane prepolymer, pentaerythritol triacrylate toluene diisocyanate urethane prepolymer, dipentaerythritol pentaacrylate toluene diisocyanate urethane prepolymer, pentaerythritol triacrylate isophorone diisocyanate urethane prepolymer, dipentaerythritol pentaacrylate isophorone diisocyanate urethane prepolymer, and the like.

The active energy ray-curable resin described above may be used singly or in combination of two or more. Moreover, the active energy ray-curable resin described above may be present, as a monomer or a oligomer obtained by partially polymerizing, in the composition for forming hard coat layer.

As the photopolymerization initiator used in the composition for forming hard coat layer, for example, 2,2-ethoxyacetophenone, 1-hydroxycyclohexylphenyl ketone, dibenzoyl, benzoin, benzoin methyl ether, benzoin ethyl ether, p-chlorobenzophenone, p-methoxybenzophenone, Michler's ketone, acetophenone, 2-chlorothioxanthone and the like can be used. One type of these may be used alone, or two or more types may be used in combination.

The solvent used in the composition for forming hard coat layer includes ethers such as dibutyl ether, dimethoxymethane, dimethoxyethane, diethoxyethane, propylene oxide, 1,4-dioxane, 1,3-dioxolane, 1,3,5-trioxane, tetrahydrofuran, anisole, phenetole and the like; ketones such as acetone, methyl ethyl ketone, diethyl ketone, dipropyl ketone, diisobutyl ketone, methyl isobutyl ketone, cyclopentanone, cyclohexanone, methylcyclohexanone, methylcyclohexanone and the like; esters such as ethyl formate, propyl formate, n-pentyl formate, methyl acetate, ethyl acetate, methyl propionate, ethyl propionate, n-pentyl acetate, γ-butyrolactone and the like, and further, cellosolves such as methyl cellosolve, cellosolve, butyl cellosolve, cellosolve acetate and the like. These may be used singly or in combination of two or more.

Further, the composition for forming hard coat layer may contain metal oxide fine particles for the purpose of adjusting the refractive index and imparting hardness. Metal oxide fine particles include zirconium oxide, titanium oxide, niobium oxide, antimony trioxide, antimony pentoxide, tin oxide, indium oxide, indium tin oxide, zinc oxide, and the like.

As other additives, a leveling agent, an antifoaming agent, an antioxidant, an ultraviolet absorber, a light stabilizer, a photosensitizer, a conductive material, and the like may be added to the composition for forming the hard coat layer.

<Low Refractive Index Layer>

The low refractive index layer 23 can be formed by applying a composition for forming low refractive index layer containing at least an active energy ray-curable resin onto a transparent substrate and curing the composition. As the active energy ray-curable resin used in the composition for forming low refractive index layer, the one described for the hard coat layer 22 can be used. Fine particles of LiF, MgF, 3NaF—AlF, AlF, $Na_3AlF_6$ and the like, or silica fine particles may be blended to the composition for forming low refractive index layer for adjusting the refractive index. For the silica fine particles, it is effective to lower the refractive index of the low refractive index layer by using porous silica fine particles, hollow silica fine particles, or the like having voids inside the particles. Further, the composition for forming low refractive index layer may appropriately contain the photopolymerization initiator, solvent, and other additives described for the hard coat layer 22. The refractive index of the low refractive index layer 23 is preferably 1.20 to 1.55. Moreover, the coating thickness of the low refractive index layer 23 is not particularly limited, but is preferably 40 nm to 1 μm.

The low refractive index layer 23 may contain any one of silicon oxides, fluorine-containing silane compounds, fluoroalkylsilazanes, fluoroalkylsilanes, fluorine-containing silicon-based compounds, and perfluoropolyether group-containing silane coupling agents. These materials can enhance an antifouling property by imparting water repellency and/or oil repellency to the low refractive index layer 23.

<Antiglare Layer>

The antiglare layer 24 is a layer that has fine unevenness on their surfaces, and reduce reflection of external light by scattering external light with these unevenness. The antiglare layer 24 can be formed by applying and curing a composition for forming antiglare layer containing an active energy ray-curable resin and, if necessary, organic fine particles and/or inorganic fine particles. As the active energy ray-curable resin used in the composition for forming antiglare layer, the one described for the hard coat layer 22 can be used. Although the coating thickness of the antiglare layer 24 is not particularly limited, it is preferably 1 to 10 μm.

The organic fine particles used in the composition for forming antiglare layer are mainly a material that forms fine unevenness on the surfaces of the antiglare layer 24 and imparts a function of diffusing external light. As the organic fine particles, resin particles made of translucent resin materials such as acrylic resins, polystyrene resins, styrene-(meth)acrylic acid ester copolymers, polyethylene resins, epoxy resins, silicone resins, polyvinylidene fluoride, polyethylene fluoride resins and the like can be used. In order to adjust the refractive index and the dispersibility of the resin particles, two or more types of resin particles having different materials (refractive indexes) may be mixed and used.

The inorganic fine particles used in the composition for forming antiglare layer are mainly a material for adjusting the sedimentation and aggregation of the organic fine particles in the antiglare layer 24. As the inorganic fine particles, silica fine particles, metal oxide fine particles, various mineral fine particles, and the like can be used. As the silica fine particles, for example, colloidal silica and silica fine particles surface-modified with reactive functional groups such as a (meth)acryloyl group, and the like can be used. As the metal oxide fine particles, for example, alumina, zinc oxide, tin oxide, antimony oxide, indium oxide, titania, zirconia and the like can be used. As the mineral fine particles, for example, mica, synthetic mica, vermiculite, montmorillonite, iron montmorillonite, bentonite, beidellite, saponite, hectorite, stevensite, nontronite, magadiite, islarite, kanemite, layered titanate, smectite, synthetic smectite and the like can be used. The mineral fine particles may be either natural products or synthetic products (including substituted products and derivatives), and a mixture of the two may be used. Among the mineral fine particles, layered organic clays are more preferred. The layered organic clay is obtained by introducing organic onium ions between layers of swelling clay. The organic onium ion is not limited as long as it can be organized by utilizing the cation exchange property of the swelling clay. When layered organic clay minerals are used as the mineral fine particles, the synthetic smectite described above can be suitably used. The synthetic smectite has a function of increasing the viscosity of a coating liquid for forming an antiglare layer, suppressing the sedimentation of resin particles and inorganic fine particles, and adjusting the irregular form of the surface of an optical functional layer.

The composition for forming antiglare layer may contain any one of silicon oxides, fluorine-containing silane compounds, fluoroalkylsilazanes, fluoroalkylsilanes, fluorine-containing silicon-based compounds, and perfluoropolyether group-containing silane coupling agents. These materials can enhance an antifouling property by imparting water repellency and/or oil repellency to the antiglare layer 24.

The antiglare layer 24 may be formed as layers in which a layer having a relatively high refractive index and a layer having a relatively low refractive index are laminated in order from the transparent substrate 20 side by unevenly distributing materials. The antiglare layer 24 in which materials are unevenly distributed can be formed by, for example, coating a composition containing a low refractive index material containing surface-modified silica fine particles or hollow silica fine particles and a high refractive index material, and causing phase separation utilizing the difference in surface free energy between them. When the antiglare layer 24 is composed of two phase-separated layers, it is preferable that the refractive index of the layer with a relatively high refractive index on the colored layer 21 side is set to 1.50 to 2.40, and the refractive index of the layer with a relatively low refractive index on the surface side of the optical film 12 is set to 1.20 to 1.55.

<Oxygen Barrier Layer>

The oxygen permeability of the oxygen barrier layer 25 is 10 cc/($m^2$*day*atm) or less, more preferably 5 cc/

$(m^2*day*atm)$ or less, and further preferably 1 cc/$(m^2*day*atm)$ or less. Due to the oxygen barrier property of the oxygen barrier layer 25, it is possible to suppress oxidative deterioration (fading) of the coloring material contained in the colored layer 21. The material for forming the oxygen barrier layer 25 preferably contains polyvinyl alcohol (PVA), ethylene-vinyl alcohol copolymer (EVOH), vinylidene chloride, siloxane resin, or the like, and MAXIVE (registered trademark) manufactured by Mitsubishi Gas Chemical Company, Inc., EVAL manufactured by Kuraray Co., Ltd., Saran Latex and Saran Resin manufactured by Asahi Kasei Corporation, and the like can be used. Moreover, the thickness of the oxygen barrier layer 25 is not particularly limited, and may be a thickness that provides a desired oxygen barrier property.

Inorganic particles (particles made of an inorganic compound) may be dispersed in the oxygen barrier layer 25. The oxygen permeability can be further reduced by inorganic particles, and oxidative deterioration (fading) of the colored layer 21 can be further suppressed. The size and content of the inorganic particles are not particularly limited, and may be appropriately set according to the thickness of the oxygen barrier layer 25, and the like. The size (maximum length) of the inorganic particles to be dispersed in the oxygen barrier layer 25 is preferably less than the thickness of the oxygen barrier layer 25, and the smaller the better. The size of the inorganic particles to be dispersed in the oxygen barrier layer 25 may be uniform or non-uniform. Specific examples of the inorganic particles to be dispersed in the oxygen barrier layer 25 include silica particles, alumina particles, silver particles, copper particles, titanium particles, zirconia particles, tin particles, and the like.

<Composition for Forming Colored Layer>

The colored layer 21 described above can be formed by applying a composition for forming colored layer containing an active energy ray-curable resin, a photopolymerization initiator, a dye, a solvent, and optional-blended additives on a transparent substrate 20, and curing the coating. As the active energy ray-curable resin, photopolymerization initiator, and solvent used in the composition for forming colored layer, those described for the hard coat layer 22 can be used. Further, as the dye, the first coloring material and the second coloring material having the absorption property described above are used, and if necessary, the third coloring material having the absorption property described above may be further blended. At least one of a radical scavenger, a singlet oxygen quencher and a peroxide decomposer can be used as the additive.

The radical scavenger has a function of scavenging radicals when the dye is oxidatively deteriorated, and has a function of suppressing autoxidation, thereby suppressing dye deterioration (fading). When a hindered amine light stabilizer having a molecular weight of 2000 or more is used as the radical scavenger, a high effect of suppressing fading can be obtained. When the molecular weight of the radical scavenger is low, it is easy to volatilize, so few molecules remain in the colored layer, making it difficult to obtain a sufficient anti-fading effect. Examples of materials suitably used as radical scavengers include Chimasorb 2020FDL, Chimasorb 944FDL, and Tinuvin 622 manufactured by BASF, and LA-63P manufactured by ADEKA, and the like.

The singlet oxygen quencher has a function of deactivating highly reactive singlet oxygen, which tends to cause oxidative deterioration (fading) of a dye, and suppressing oxidative deterioration (fading) of the dye. The singlet oxygen quencher includes transition metal complexes, dyes, amines, phenols, and sulfides, and particularly preferred materials include transition metal complexes of dialkyl phosphate, dialkyldithiocarbamate or benzenedithiol, or similar dithiol, and as the central metal thereof, nickel, copper or cobalt is preferably used.

The peroxide decomposer has a function of decomposing a peroxide generated when a dye is oxidatively deteriorated, stopping the auto-oxidation cycle, and suppressing the dye deterioration (fading). Phosphorus-based antioxidants and sulfur-based antioxidants can be used as the peroxide decomposer.

Examples of the phosphorus-based antioxidant include 2,2'-methylenebis(4,6-di-t-butyl-1-phenyloxy)(2-ethylhexyloxy)phosphorus, 3,9-bis(2,6-di-tert-butyl-4-methylphenoxy)-2,4,8,10-tetraoxa-3,9-diphosphaspiro[5.5]undecane, and 6-[3-(3-t-butyl-4-hydroxy-5-methylphenyl)propoxy]-2,4,8,10-tetra-t-butyldibenz[d,f][1,3,2]dioxaphosphepine, and the like.

Examples of the sulfur-based antioxidant include 2,2-bis({[3-(dodecylthio)propionyl]oxy}methyl)-1,3-propanediyl-bis[3-(dodecylthio)propionate], 2-mercaptobenz imidazole, dilauryl-3,3'-thiodipropionate, dimyristyl-3,3'-thiodipropionate, distearyl-3,3'-thiodipropionate, pentaerythrityl-tetrakis(3-laurylthiopropionate), 2-mercaptobenzothiazole, and the like.

As described above, the optical films 11 to 15 according to the present invention have the colored layer 21 containing a visible light-absorbing dye on one surface side of the transparent substrate 20 having ultraviolet absorbability. Part of the external light incident on the optical films 11 to 15 is absorbed by the colored layer 21 in the process of entering the display panel 10 and the process of being reflected by the display panel 10 and re-emitted from the optical films 11 to 13, and the intensity of the reflected light of external light is reduced. Thereby, the contrast and visibility of the display images of the display devices 1 to 3 can be improved. In addition, by absorbing incident ultraviolet ray by the transparent substrate 20 placed closer to the observation side than the colored layer 21, it is possible to suppress the fading of the dye and maintain the display performance of the display devices 1 to 5.

In addition, when the optical films 11 to 15 according to the present invention are used, the visible light transmittance of the optical film can be increased to 50% or more by selection and blending amount of the dye, thus, the luminance of the display device 1 can be improved compared to the conventional configuration using a circularly polarizing plate, without increasing the emission intensity of the display panel 10. Moreover, since it is not necessary to increase the emission intensity of the display panel 10 in order to improve the luminance, the durability of the display panel 10 can be improved. In addition, since the coating of the colored layer 21 can realize the function of cutting visible light by a conventional circularly polarizing plate, the thickness of the display devices 1 to 5 can be reduced as compared with the case of using the circularly polarizing plate.

The present invention can also be applied to a composition for forming colored layer for forming a colored layer containing a dye. The composition for forming colored layer contains an active energy ray-curable resin, a photopolymerization initiator, a dye, a solvent, and an additive. As the dye, the two types of materials described above, namely, the first coloring material having a maximum absorption wavelength in the range of 470 to 530 nm and a half width of the absorption spectrum of 15 to 45 nm, and the second coloring material having a maximum absorption wavelength in the range of 560 to 620 nm and a half width of the absorption spectrum of 15 to 55 nm are blended. Furthermore, by containing a third coloring material within the range of 650 to 800 nm, panel reflection of external light can be further reduced.

An antifouling layer may be provided on the outermost surface of the optical film according to each of the above embodiments. The antifouling layer enhances an antifouling property by imparting water repellency and/or oil repellency to the optical laminate, and can be formed by dry-coating or wet-coating a silicon oxide, a fluorine-containing silane compound, a fluoroalkylsilazane, a fluoroalkylsilane, a fluorine-containing silicon-based compound, a perfluoro polyether group-containing silane coupling agent, or the like.

Also, an antistatic layer may be provided on the optical film according to each of the above embodiments. The antistatic layer can be formed by applying a coating liquid containing an ionizing radiation-curable material such as a polyester acrylate-based monomer, an epoxy acrylate-based monomer, a urethane acrylate-based monomer, a polyol acrylate-based monomer or the like, a polymerization initiator, and an antistatic agent, and curing through polymerization. As the antistatic agent, for example, metal oxide-based fine particles such as antimony-doped tin oxide (ATO), tin-doped indium oxide (ITO) and the like, polymeric conductive compositions, quaternary ammonium salts, and the like can be used. The antistatic layer may be provided on the outermost surface of the optical laminate, or may be provided between the optical functional layer and the transparent substrate. Alternatively, an antistatic layer may be formed by blending an antistatic agent to any of the layers constituting the optical functional layers described above. When the antistatic layer is provided, the optical film preferably has a surface resistance value of $1.0\times10^{6}$ to $1.0\times10^{12}$ (Ω/cm).

In addition, in the optical films according to the first and third embodiments, a medium refractive index layer may be further provided between the colored layer and the hard coat layer in order to improve the performance of the antireflection layer. In this case, layers may be laminated sequentially from the transparent substrate side in the order of a medium refractive index layer, a high refractive index layer (a layer functioning as a high refractive index layer), and a low refractive index layer. The medium refractive index layer can be formed by applying a composition for forming medium refractive index layer containing at least an active energy ray-curable resin to a transparent substrate and curing the composition. As the active energy ray-curable resin used in the composition for forming low refractive index layer, the one described for the hard coat layer can be used. Metal fine particles of zirconium oxide, titanium oxide, niobium oxide, antimony trioxide, antimony pentoxide, tin oxide, indium oxide, indium tin oxide, zinc oxide and the like may be blended into the composition for forming medium refractive index layer for adjusting the refractive index. In addition, the composition for forming medium refractive index layer may be appropriately blended with the photopolymerization initiator, solvent, and other additives described for the hard coat layer.

In the optical film according to the second embodiment described above, an antireflection layer including a high refractive index layer and a low refractive index layer may be further provided on the antiglare layer in order to improve antireflection performance and display quality.

EXAMPLES

Examples are described below. However, the present invention is not limited by the following examples.

In the following examples and comparative examples, optical films 1 to 15 having layer structures shown in Tables 1A, 1B and 2 were produced, and the properties of the produced films were evaluated. Further, the display device properties of the organic EL panels using the optical films 1 to 15 were confirmed by simulation.

TABLE 1A

| | Example 1 | Example 2 | Example 3 | Example 4 | Example 5 |
|---|---|---|---|---|---|
| optical film | optical film 1 | optical film 2 | optical film 3 | optical film 4 | optical film 5 |
| functional layer 1 | low refractive index layer 1 | — | low refractive index layer 1 | low refractive index layer 1 | low refractive index layer 1 |
| functional layer 2 | hard coat layer 1 | antiglare layer 1 | hard coat layer 1 | hard coat layer 1 | hard coat layer 1 |
| functional layer 3 | — | — | — | — | — |
| substrate | TAC | TAC | TAC | TAC | PMMA |
| colored layer | colored layer 1 | colored layer 1 | colored layer 2 | colored layer 3 | colored layer 3 |

TABLE 1B

| | Example 6 | Example 7 | Example 8 | Example 9 | Example 10 |
|---|---|---|---|---|---|
| optical film | optical film 6 | optical film 7 | optical film 8 | optical film 9 | optical film 10 |
| functional layer 1 | low refractive index layer 1 | low refractive index layer 1 | low refractive index layer 1 | low refractive index layer 1 | low refractive index layer 1 |
| functional layer 2 | hard coat layer 1 | hard coat layer 1 | hard coat layer 1 | hard coat layer 1 | hard coat layer 1 |
| functional layer 3 | — | — | oxygen barrier layer 1 | — | — |
| substrate | PET1 | PET2 | TAC | TAC | TAC |
| colored layer | colored layer 3 | colored layer 3 | colored layer 1 | colored layer 6 | colored layer 5 |

TABLE 2

| | Example 11 | Comparative Example 1 | Comparative Example 2 | Comparative Example 3 | Comparative Example 4 |
|---|---|---|---|---|---|
| optical film | optical film 11 | optical film 12 | optical film 13 | optical film 14 | optical film 15 |
| functional layer 1 | — | low refractive index layer 1 | low refractive index layer 1 | — | low refractive index layer 1 |
| functional layer 2 | hard coat layer 1 | hard coat layer 1 | hard coat layer 1 | hard coat layer 1 | hard coat layer 1 |
| functional layer 3 | — | — | — | — | — |
| colored layer/substrate | TAC | colored layer 1 | colored layer 4 | colored layer 1 | TAC |
| colored layer/substrate | colored layer 1 | TAC | TAC | TAC | — |

<Production of Optical Film>

A method for forming each layer will be described below.

[Formation of Colored Layer]

(Materials Used in Composition for Forming Colored Layer)

The following materials were used for the composition for forming colored layer used for forming a colored layer.

The maximum absorption wavelength and half width of a coloring material were calculated from the spectral transmittance using characteristic values of the cured coating.

First Coloring Material:

Dye-1: pyrromethene cobalt complex colorant represented by chemical formula 1 described later (maximum absorption wavelength: 493 nm, half width: 26 nm)

Second Coloring Material:

Dye-2: tetraazaporphyrin copper complex colorant (FDG-007 manufactured by Yamada Chemical Co., Ltd., maximum absorption wavelength 595 nm, half width: 22 nm)

Dye-3: tetraazaporphyrin copper complex colorant (PD-311S manufactured by Yamamoto Chemicals, Inc., maximum absorption wavelength: 586 nm, half width: 22 nm)

Third Coloring Material:

Dye-4: phthalocyanine copper complex colorant (FDN-002: manufactured by Yamada Chemical Co., Ltd., maximum absorption wavelength: 800 nm)

Additive:

hindered amine light stabilizer: Chimassorb 944FDL (manufactured by BASF Japan, molecular weight: 2000 to 3100)

hindered amine light stabilizer: Tinuvin249 (manufactured by BASF Japan, molecular weight: 482)

singlet oxygen quencher: D1781 (manufactured by Tokyo Chemical Industry Co., Ltd.)

Ultraviolet Absorber:

Tinuvin479 (manufactured by BASF Japan, maximum absorption wavelength: 322 nm)

LA-36 (manufactured by ADEKA, maximum absorption wavelength: 310 nm, 350 nm)

Active Energy Ray-Curable Resin:

UA-306H (manufactured by Kyoeisha Chemical Co., Ltd., pentaerythritol triacrylate hexamethylene diisocyanate urethane prepolymer)

DPHA (dipentaerythritol hexaacrylate)

PETA (pentaerythritol triacrylate)

Initiator: Omnirad 184 (Manufactured by IGM Resin B.V.)

Solvent:

MEK (methyl ethyl ketone)

methyl acetate

Chemical Formula 1

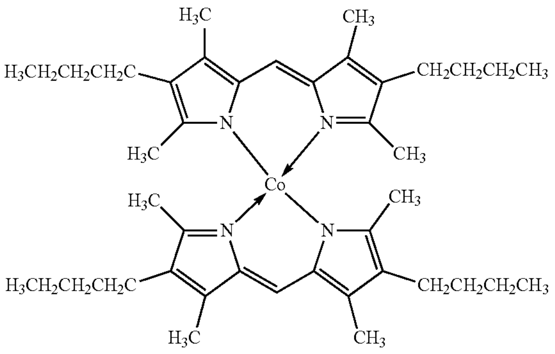

(Substrate)

The following materials were used as the transparent substrate.

TAC:

triacetyl cellulose film (TG60UL manufactured by FUJIFILM Corporation substrate thickness 60 μm, ultraviolet shielding rate 92.9%)

PMMA:

polymethyl methacrylate film (W001U80 manufactured by Sumitomo Chemical Co., Ltd., substrate thickness 80 μm, ultraviolet shielding rate 93.4%)

PET1:

polyethylene terephthalate film (SRF manufactured by Toyobo Co., Ltd., substrate thickness 80 μm, ultraviolet shielding rate 88.3%)

PET2:

polyethylene terephthalate film (TOR20 manufactured by SKC, substrate thickness 40 μm, ultraviolet shielding rate 88.6%)

(Formation of Colored Layer)

The composition for forming colored layer shown in Table 3 was applied onto the substrates shown in Tables 1A, 1B and 2, and dried in an oven at 80° C. for 60 seconds. After that, the coating was cured by performing ultraviolet irradiation with an irradiation dose of 150 $mJ/cm^2$ using an ultraviolet irradiation device (manufactured by Fusion UV Systems Japan, light source H bulb), and colored layers 1 to 6 were formed so that the coating thickness after curing was 5.0 μm. The addition amount is a mass ratio.

TABLE 3

| | | colored layer 1 | colored layer 2 | colored layer 3 | colored layer 4 | colored layer 5 | colored layer 6 |
|---|---|---|---|---|---|---|---|
| coloring material | first coloring material | Dye-1 | | | | | |
| | addition amount | 0.2% | 0.2% | 0.2% | 0.2% | 0.2% | 0.0% |
| | second coloring material | Dye-2/ Dye-3 | | | | | |
| | ratio | 60/40 | | | | | |
| | addition amount | 0.5% | 0.5% | 0.5% | 0.5% | 0.5% | 0.0% |
| | third coloring material | — | — | — | — | — | Dye-4 |
| | addition amount | — | — | — | — | — | 0.0% |
| additive | type | — | Chimassorb 944FDL | Chimassorb 944FDL/ D1781 | — | Tinuvin249 | Chimassorb 944FDL/ D1781 |
| | ratio | — | 100 | 67/33 | — | 100 | 67/33 |
| | addition amount | — | 1.4% | 2.2% | — | 1.4% | 3.2% |
| ultraviolet absorber | type | — | | | Tinuvin479/ LA36 | — | — |
| | ratio | — | | | 40/60 | — | — |
| | addition amount | — | | | 3.20% | — | — |
| active energy ray-curable resin | type | UA-306H/ DPHA/PETA | | | | | |
| | ratio | 70/20/10 | | | | | |
| | addition amount | 44.7% | 43.3% | 42.5% | 41.5% | 43.3% | 40.3% |
| photopolymerization initiator | type | Omnirad 184 | | | | | |
| | addition amount | 4.6% | | | | | |
| solvent | type | MEK/ methyl acetate | | | | | |
| | ratio | 50/50 | | | | | |
| | addition amount | 50% | | | | | |

[Formation of Functional Layer]

Composition for Forming Oxygen Barrier Layer:

80% aqueous solution of PVA117 (manufactured by Kuraray Co., Ltd.)

(Formation of Oxygen Barrier Layer)

The composition for forming oxygen barrier layer described above was applied onto the transparent substrate in Example 8 shown in Table 1B, and dried, to form an oxygen barrier layer 1 shown in Table 1B having an oxygen permeability of 1 cc/($m^2$*day*atm).

(Composition for Forming Hard Coat Layer)

The following materials were used for the composition for forming hard coat layer used to form a hard coat layer.

Active Energy Ray-Curable Resin:

UA-306H (manufactured by Kyoeisha Chemical Co., Ltd., pentaerythritol triacrylate hexamethylene diisocyanate urethane prepolymer)

DPHA (dipentaerythritol hexaacrylate)

PETA (pentaerythritol triacrylate)

Initiator:

Omnirad: TPO (manufactured by IGM Resins B.V., absorption wavelength peak: 275 nm, 379 nm)

Solvent:

MEK (methyl ethyl ketone)

methyl acetate (Formation of Hard Coat Layer)

The composition for forming hard coat layer shown in Table 4 was applied onto the transparent substrate or the oxygen barrier layer shown in Tables 1A, 1B and 2, dried in an oven at 80° C. for 60 seconds, and after that, the coating was cured by performing ultraviolet irradiation with an irradiation dose of 150 mJ/$cm^2$ using an ultraviolet irradiation device (manufactured by Fusion UV Systems Japan, light source H bulb), and hard coat layers 1 in Tables 1A, 1B and 2 having a coating thickness of 5.0 μm after curing were formed.

TABLE 4

| | | hard coat layer 1 |
|---|---|---|
| active energy ray-cutable resin | type | UA-306H/DPHA/PETA |
| | ratio | 70/20/10 |
| | addition amount | 45.4% |
| photopolymerization initiator | type | Omnirad TPO |
| | addition amount | 4.6% |
| solvent | type | MEK/methyl acetate |
| | ratio | 50/50 |
| | addition amount | 50% |

(Composition for Forming Antiglare Layer)

The following materials were used for the composition for forming antiglare layer used to form an antiglare layer.

Active Energy Ray-Curable Resin:

Light acrylate PE-3A (manufactured by Kyoeisha Chemical Co., Ltd., refractive index: 1.52)

Photopolymerization Initiator:

Omnirad: TPO (manufactured by IGM Resins B.V., absorption wavelength peak: 275 nm, 379 nm)

Resin Particles:

styrene-methyl methacrylate copolymer particles (refractive index: 1.515, average particle size: 2.0 μm)

Inorganic Fine Particles 1:

synthetic smectite

Inorganic Fine Particles 2:

alumina nano particles, average particle size 40 nm

Solvent toluene isopropyl alcohol (Formation of Antiglare Layer)

The composition for forming antiglare layer shown in Table 5 was applied onto the transparent substrate in Example 2 shown in Table TA, dried in an oven at 80° C. for 60 seconds, and after that, the coating was cured by performing ultraviolet irradiation with an irradiation dose of 150 $mJ/cm^2$ using an ultraviolet irradiation device (manufactured by Fusion UV Systems Japan, light source H bulb), and an antiglare layer 1 in Table TA having a coating thickness of 5.0 μm after curing was formed.

TABLE 5

| | | antiglare layer 1 |
|---|---|---|
| active energy ray | type | PE-3A |
| | addition amount | 43.7% |
| organic fine particle | type | styrene-methyl methcrylate copolymer particle |
| | addition amount | 0.5% |
| inorganic fine particle | type | synthetic smectite/alumina nano particle |
| | ratio | 20/80 |
| | addition amount | 1.25% |
| photopolymerization initiator | type | Omnirad TPO |
| | addition amount | 4.55% |
| solvent | type | toluene/isopropyl alcohol |
| | ratio | 30/70 |
| | addition amount | 50% |

(Materials Used for Composition for Forming Low Refractive Index Layer)

The following composition was used as the composition for forming low refractive layer used to form a low refractive index layer.

Refractive Index Adjuster:

porous silica fine particle dispersion (average particle size 75 nm, solid content 20%, solvent: methyl isobutyl ketone): 8.5 parts by mass Anti-Fouling Agent:

OPTOOL AR-110 (manufactured by Daikin Industries, Ltd., solid content 15%, solvent: methyl isobutyl ketone): 5.6 parts by mass Active Energy Ray-Curable Resin:

pentaerythritol triacrylate: 0.4 parts by mass

Initiator:

Omnirad: 184 (manufactured by IGM: Resins B.V.): 0.07 parts by mass

Leveling Agent:

RS-77 (manufactured by DIC): 1.7 parts by mass

Solvent:

methyl isobutyl ketone: 83.73 parts by mass (Formation of Low Refractive Index Layer)

The composition for forming low refractive index layer having the above composition was applied onto the constitutions shown in Tables 1A, 1B and 2, and dried in an oven at 80° C. for 60 seconds, and after that, the coating was cured by performing ultraviolet irradiation with an irradiation dose of 200 $mJ/cm^2$ using an ultraviolet irradiation device (manufactured by Fusion UV Systems Japan, light source H bulb), and low refractive index layers in Tables 1A, 1B and 2 having a coating thickness of 100 nm after curing were formed.

[Film Property Evaluation]

(Ultraviolet Shielding Rate on Colored Layer)

In Examples 1 to 11 in which the substrate was above the colored layer and Comparative Example 4 in which no colored layer was used, the transmittance was measured using an automatic spectrophotometer (manufactured by Hitachi, Ltd., U-4100). In contrast, in Comparative Examples 1 to 3 in which the colored layer was above the substrate, the upper layer was peeled from the colored layer using a cellophane tape according to JIS-K5600 adhesion test, and the transmittance of the upper colored layer was measured using an adhesive tape as the reference using an automatic spectrophotometer (manufactured by Hitachi, Ltd., U-4100). Using these transmittance values, the average transmittance in the ultraviolet region (290 to 400 nm) was calculated, and the ultraviolet shielding rate shown in formula (1) was calculated.

Ultraviolet shielding rate (%)=100−average transmittance (%) in the ultraviolet region(290 to 400 nm) Formula (1)

(Pencil Hardness Test)

The surface of the optical film was tested using Clemens type scratch hardness tester (HA-301, manufactured by Tester Sangyo Co., Ltd.) in accordance with JIS-K5400-1990 using a pencil (UNI, pencil hardness H, manufactured by Mitsubishi Pencil Co., Ltd.) under a load of 500 g applied, and the change in appearance due to scratches was visually evaluated, and the case where no scratches were observed was rated as ○, and the case where scratches were observed was rated as x.

(Light Resistance Test)

As a reliability test of the obtained optical film including the colored layer, the test was conducted for 120 hours using a xenon weather meter tester (manufactured by Suga Test Instruments Co., Ltd., X75) at a Xenon lamp illuminance of 60 $W/cm^2$ (300 to 400 nm), a temperature of 45° C. and a humidity of 50% RH inside the test machine, and before and after the test, the transmittance was measured using an automatic spectrophotometer (U-4100, manufactured by Hitachi, Ltd.), and the transmittance difference $\Delta T\lambda 1$ before and after the test at wavelength $\lambda 1$ showing the minimum transmittance before test in the wavelength range of 470 to 530 nm, and the transmittance difference $\Delta T\lambda 2$ before and after the test at wavelength $\lambda 2$ showing the minimum transmittance before test in the wavelength range of 560 to 620 nm, and the color difference $\Delta Eab$ with C light source before and after the test were calculated. The transmittance difference and the color difference close to zero are preferable, and $\Delta Eab \leq 5$ is preferable.

[Evaluation of Display Device Property]

(Transmission Property)

The transmittance of the obtained optical film was measured using an automatic spectrophotometer (U-4100, manufactured by Hitachi, Ltd.), and the efficiency of light transmitted through the optical film during white display was calculated using this transmittance, and evaluated as a white display transmission property. As a reference, the efficiency of the spectrum at the time of white display output through the white organic EL light source having the spectrum and the color filter shown in FIG. 6 was taken as 100.

(Reflection Property)

The transmittance of the obtained optical film was measured using an automatic spectrophotometer (U-4100, manufactured by Hitachi, Ltd.). When the display panel reflectance was 40% and the optical film was provided with an antireflection layer such as a low refractive index layer or an antiglare layer on the observation side outermost layer, the surface reflectance R was set to 1%, and when it was not provided, the surface reflectance R was set to 4%, and without considering the interface reflection and surface reflection on other layers, the relative reflection value when the display device reflection value for the D65 light source in the absence of the optical film was taken as 100 was calculated based on the formula (2), and evaluated as the display device reflection property.

Formula (2)

$$\text{Display device reflective property} = R + Km \times \int_{380}^{780} (1-R) \times P(\lambda) \times T(\lambda) \times T(\lambda) \times \bar{y}(\lambda) \times 40\% \quad Km = 100 / \int_{380}^{780} P(\lambda) \times \bar{y}(\lambda)$$

Here, R is the surface reflectance of the outermost layer on the observer side, $T(\lambda)$ is the transmittance of the optical film, $P(\lambda)$ is the D65 light source spectrum, and $\bar{y}(\lambda)$ is the CIE1931 color matching function.

(Color Reproducibility)

Figure 6:
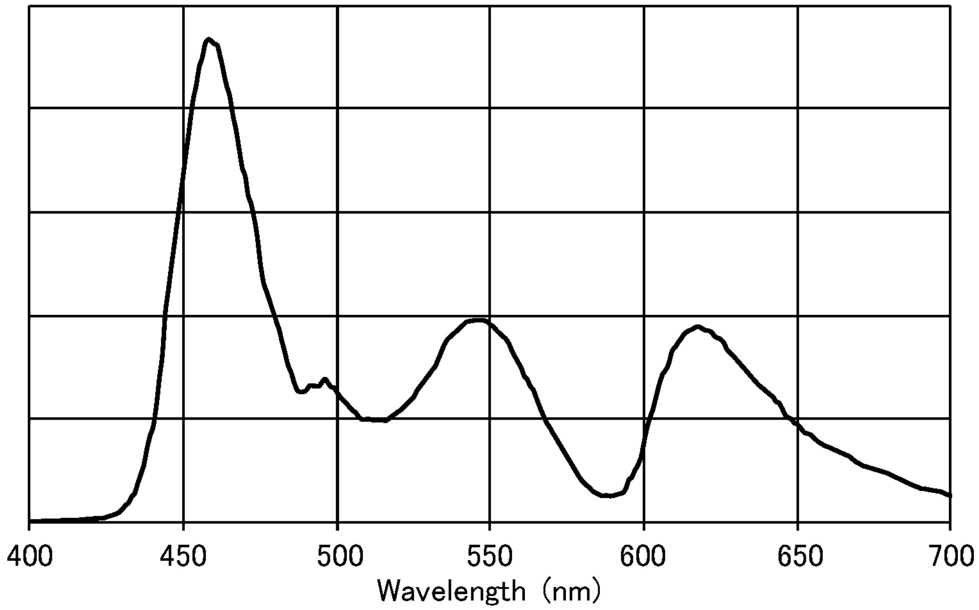
FIG. 6 shows the spectrum of the light source used for evaluating the transmission property.
Figure 7:
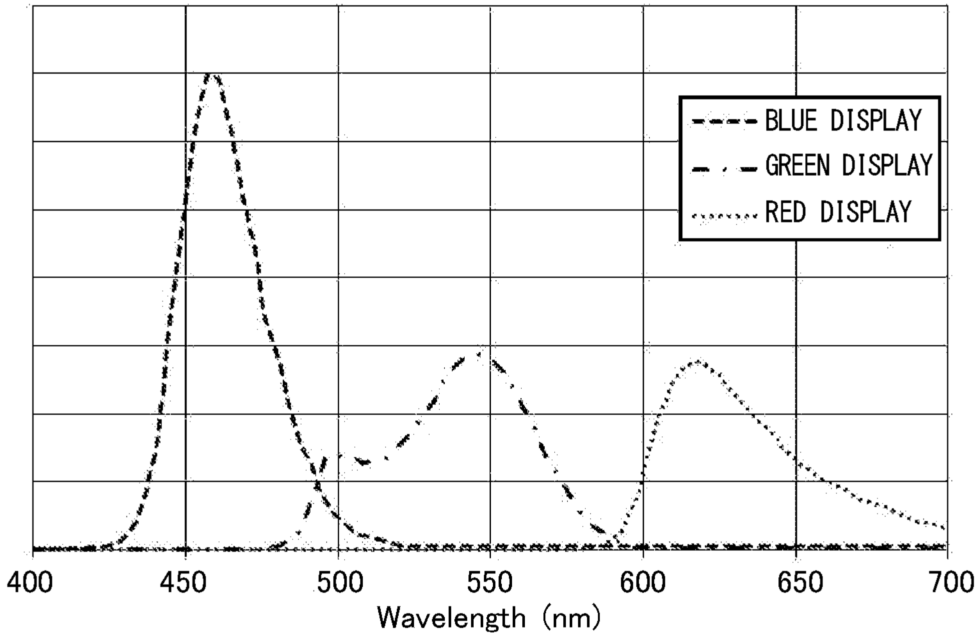
FIG. 7 shows the spectra of the light source used for evaluation of the color reproducibility.

The transmittance of the obtained optical film was measured using an automatic spectrophotometer (U-4100, manufactured by Hitachi, Ltd.), and the red display, green display and blue display spectra in FIG. 7 output through the white EL light source of the spectrum shown in FIG. 6 and a color filter were measured. The NTSC ratio was calculated from the CIE1931 chromaticity values calculated using the measured transmittance and the red display, green display, and blue display spectra in FIG. 7, and the NTSC ratio was evaluated as an index for color reproducibility.

As the evaluation of the properties of the optical film, the results of the ultraviolet shielding rate of the ultraviolet absorbing layer, the pencil hardness, and the light resistance test are shown, and as the evaluation of the properties of the display device, the white display transmission property, the display device reflection property, and the color reproducibility are shown, in Tables 6A, 6B and 7.

From the results in Tables 6A, 6B and 7, the reflective properties of the display device with the colored layer were significantly lowered. In addition, while it is said that the transmittance is halved with a circularly polarizing plate, as shown in the evaluation value of the white display transmission property, a display device having a colored layer has excellent luminance efficiency and further improved color reproducibility.

In addition, by providing no ultraviolet absorbing function in the colored layer as in Comparative Example 2 and using the substrate having high ultraviolet shielding rate as the ultraviolet absorbing layer, the hardness of the optical film was kept and the light resistance of the colored layer was also improved significantly. Furthermore, the light resistance was further improved by lamination of an oxygen barrier layer and inclusion of a high molecular weight hindered amine light stabilizer as a radical scavenger and a dialkyldithiocarbamate nickel complex as a singlet oxygen quencher in the colored layer.

TABLE 6A

| | | Example 1 | Example 2 | Example 3 | Example 4 | Example 5 | Example 6 |
|---|---|---|---|---|---|---|---|
| ultraviolet shielding rate on colored layer | | 92.9% | 92.9% | 92.9% | 92.9% | 93.4% | 88.3% |
| pencil hardness | | ○ | ○ | ○ | ○ | ○ | ○ |
| colored layer light resistance | ⊿Tλ1 | 22.1 | 21.8 | 13.4 | 6.5 | 6.5 | 8.3 |
| | ⊿Tλ2 | 4.8 | 4.5 | 4.0 | 1.9 | 1.6 | 5.1 |
| | ⊿Eab | 4.9 | 4.8 | 3.3 | 2.9 | 3.0 | 2.1 |
| white display transmission property | | 62.7 | 62.5 | 62.8 | 61.4 | 60.4 | 60.0 |
| | relative to Comparative Example 4 | 69% | 68% | 69% | 67% | 66% | 66% |
| display device reflection property | | 15.2 | 15.1 | 15.3 | 14.7 | 14.2 | 14.1 |
| | relative to Comparative Example 4 | 45% | 45% | 45% | 43% | 42% | 42% |
| color reproducibility | NTSC ratio | 98.5% | 98.5% | 98.5% | 98.9% | 98.9% | 98.9% |

TABLE 6B

| | | Example 7 | Example 8 | Example 9 | Example 10 | Example 11 |
|---|---|---|---|---|---|---|
| ultraviolet shielding rate on colored layer | | 88.6% | 92.9% | 92.9% | 92.9% | 92.9% |
| pencil hardness | | ○ | ○ | ○ | ○ | ○ |
| colored layer light resistance | ⊿Tλ1 | 8.3 | 6.2 | 7.0 | 20.7 | 22.2 |
| | ⊿Tλ2 | 4.5 | 3.5 | 2.2 | 4.4 | 4.8 |
| | ⊿Eab | 2.0 | 1.6 | 3.0 | 4.8 | 4.9 |
| white display transmission property | | 61.3 | 62.7 | 59.1 | 63.7 | 61.4 |
| | relative to Comparative Example 4 | 67% | 69% | 65% | 70% | 67% |
| display device reflection property | | 14.7 | 15.5 | 13.6 | 15.4 | 16.5 |
| | relative to Comparative Example 4 | 43% | 46% | 40% | 46% | 49% |
| color reproducibility | NTSC ratio | 99.0% | 98.5% | 97.9% | 98.2% | 98.4% |

TABLE 7

| | | Comparative Example 1 | Comparative Example 2 | Comparative Example 3 | Comparative Example 4 |
|---|---|---|---|---|---|
| ultraviolet shielding rate on colored layer | | 7.2% | 7.2% | 7.2% | — |
| pencil hardness | | ○ | x | ○ | ○ |
| colored layer light resistance | ⊿Tλ1 | 43.0 | 49.1 | 43.2 | — |
| | ⊿Tλ2 | 49.7 | 29.5 | 49.6 | — |
| | ⊿Eab | 13.7 | 10.6 | 13.8 | — |
| white display transmission property | | 63.0 | 62.3 | 61.7 | 91.4 |
| | relative to Comparative Example 4 | 69% | 68% | 68% | 100% |
| display device reflection property | | 15.4 | 15.1 | 16.8 | 33.8 |
| | relative to Comparative Example 4 | 46% | 45% | 50% | 100% |
| color reproducibility | NTSC ratio | 98.5% | 98.6% | 98.5% | 91.7% |

The present invention can be utilized as an optical film used for a display device.

Although the present invention has been described in detail above, the above description is merely an example of the present invention in all respects and does not intend to limit the scope thereof. It is needless to say that various improvements and modifications can be made without departing from the scope of the present invention.

What is claimed is:

1. An optical film comprising a transparent substrate, a colored layer laminated on one surface side of the transparent substrate and including a dye, and a functional layer laminated on the other surface side of the transparent substrate, wherein the dye includes a first coloring material having a maximum absorption wavelength in the range of 470 to 530 nm and a half width of the absorption spectrum of 15 to 45 nm, and a second coloring material having a maximum absorption wavelength in the range of 560 to 620 nm and a half width of the absorption spectrum of 15 to 55 nm, and, wherein the transparent substrate has an ultraviolet shielding rate of 85% or more according to JIS L 1925, the first coloring material is a pyrromethene cobalt complex, and the colored layer includes a hindered amine light stabilizer having a molecular weight of 2000 or more.

2. The optical film according to claim 1, wherein the surface has a pencil hardness of H or higher under a load of 500 g.

3. The optical film according to claim 1, wherein the colored layer includes at least one of a peroxide decomposer or a singlet oxygen quencher.

4. The optical film according to claim 3, wherein the singlet oxygen quencher included in the colored layer is a transition metal complex of dialkyl phosphate, dialkyldithiocarbamate or benzenedithiol or similar dithiol.

5. The optical film according to claim 1, wherein the colored layer further includes, as the dye, a third coloring material having a maximum absorption wavelength within the range of 650 to 800 nm.

6. The optical film according to claim 1, wherein the dye included in the colored layer includes one or more compounds selected from the group consisting of compounds having any one of a porphyrin structure, a merocyanine structure, a phthalocyanine structure, an azo structure, a cyanine structure, a squarylium structure, a coumarin structure, a polyene structure, a quinone structure, a tetraazaporphyrin structure, a pyrromethene structure and an indigo structure and metal complexes thereof.

7. The optical film according to claim 1, further comprising an oxygen barrier layer having an oxygen permeability of 10 cc/($m^2$*day*atm) or less between the transparent substrate and the colored layer or on the other side of the transparent substrate.

8. The optical film according to claim 1, wherein the functional layer comprises an antireflection layer including a high refractive index layer and a low refractive index layer, or an antiglare layer.

9. The optical film according to claim 1, further comprising an antistatic layer or an antifouling layer.

10. A display device comprising the optical film according to claim 1.

11. A composition for forming colored layer comprising an active energy ray-curable resin, a photopolymerization initiator, a dye, an additive, and a solvent, wherein the dye includes a first coloring material having a maximum absorption wavelength in the range of 470 to 530 nm and a half width of the absorption spectrum of 15 to 45 nm, and a second coloring material having a maximum absorption wavelength in the range of 560 to 620 nm and a half width of the absorption spectrum of 15 to 55 nm, wherein the first coloring material is a pyrromethene cobalt complex, and the additive contains a hindered amine light stabilizer having a molecular weight of 2000 or more.

* * * * *